(12) United States Patent
Liu (10) Patent No.: US 8,942,373 B2
(45) Date of Patent: Jan. 27, 2015

(54) DATA ENCRYPTION AND DECRYPTION METHOD AND APPARATUS

(75) Inventor: Hui Liu, Beijing (CN)

(73) Assignee: Beijing Z & W Technology Consulting Co., Ltd., Beijing (CN)

( * ) Notice: Subject to any disclaimer, the term of this patent is extended or adjusted under 35 U.S.C. 154(b) by 456 days.

(21) Appl. No.: 13/001,022

(22) PCT Filed: Dec. 1, 2010

(86) PCT No.: PCT/CN2010/079315
§ 371 (c)(1),
(2), (4) Date: Dec. 22, 2010

(87) PCT Pub. No.: WO2012/071714
PCT Pub. Date: Jun. 7, 2012

(65) Prior Publication Data
US 2012/0134492 A1 May 31, 2012

(30) Foreign Application Priority Data
Nov. 29, 2010 (CN) .......................... 2010 1 0566289

(51) Int. Cl.
*H04L 9/00* (2006.01)
*H04L 9/28* (2006.01)
*H04L 9/06* (2006.01)
*H04L 9/14* (2006.01)
*H04L 29/06* (2006.01)
*H04L 9/16* (2006.01)

(52) U.S. Cl.
CPC ................ *H04L 9/0656* (2013.01); *H04L 9/14* (2013.01); *H04L 63/045* (2013.01); *H04L 9/16* (2013.01)
USPC .......................................... 380/28; 380/262

(58) Field of Classification Search
CPC ............ H04L 9/14; H04L 9/16; H04L 63/045
USPC ..................................... 380/28, 262; 713/166
See application file for complete search history.

(56) References Cited

U.S. PATENT DOCUMENTS

| 4,652,990 | A | * | 3/1987 | Pailen et al. | 705/56 |
|---|---|---|---|---|---|
| 5,590,200 | A | * | 12/1996 | Nachman et al. | 380/46 |
| 5,995,623 | A | * | 11/1999 | Kawano et al. | 713/189 |
| 6,704,871 | B1 | * | 3/2004 | Kaplan et al. | 713/192 |
| 8,225,569 | B2 | * | 7/2012 | Kinpara et al. | 52/309.4 |
| 2002/0002076 | A1 | * | 1/2002 | Schneier et al. | 463/29 |

(Continued)

*Primary Examiner* — Jung Kim
*Assistant Examiner* — Thomas Ho
(74) *Attorney, Agent, or Firm* — Enshan Hong; VLP Law Group LLP (57) ABSTRACT

This present application relates to data encryption and decryption technology, and especially relates to a data encryption and decryption method and apparatus. The described encryption method comprises: packeting plaintext data to be encrypted, randomly assigning an encryption function to each group of the plaintext data, encrypting each group of the plaintext data with the encryption function respectively, and arranging the encrypted data according to its corresponding position in the plaintext data to form a ciphertext. The encryption apparatus includes: packet module, encryption function random assignment module and encryption processing module. This application also provides a data decryption method and apparatus. This invention randomly assigns an encryption function to the plaintext to be encrypted, and uses the assigned encryption function to encrypt the plaintext data to arrange and form a ciphertext, greatly strengthening the security of data storage, and achieving the perfect secrecy of data.

5 Claims, 7 Drawing Sheets

(56) References Cited

U.S. PATENT DOCUMENTS

2004/0111617 A1* 6/2004 Patrick .......................... 713/176
2004/0215956 A1* 10/2004 Venkatachary et al. ...... 713/150
2006/0259508 A1* 11/2006 Sikdar et al. .................. 707/102
2007/0211892 A1* 9/2007 Ohkoshi ......................... 380/30
2008/0304667 A1* 12/2008 Mihaljevic et al. ........... 380/268

* cited by examiner

DATA ENCRYPTION AND DECRYPTION METHOD AND APPARATUS

RELATED APPLICATIONS

This is a U.S. National Phase Application under 35 USC §371 of International Application PCT/CN2010/079315 filed on Dec. 1, 2010.

This application claims the priority of Chinese Patent Application No. 201010566289.5 filed Nov. 29, 2010, the entire content of which is hereby incorporated by reference.

TECHNICAL FIELD

This invention belongs to the field of data encryption and decryption technology, and especially relates to a data encryption and decryption method and apparatus.

BACKGROUND OF THIS INVENTION

The data protected by the perfect secrecy system are unable to be cracked no matter how many ciphertexts cryptanalysts intercept, in the infinite computing power and time conditions, and the specific content refers to the document Shannon, Claude (1949). Communication Theory of Secrecy Systems, Bell System Technical Journal 28 (4): 656-715.

The one-time-pad (hereinafter referred to as OTP) is one of the typical implementations, and the relevant content can refer to the following documents, U.S. Pat. No. 1,310,719. SECRET SIGNALING SYSTEM, S N Molotkov, "Quantum cryptography and V A Kotel'nikov's one-time key and sampling theorems", PHYS-USP, 2006, 49 (7), 750-761 and Pages 6 and 12 of *Applied Cryptography* issued by the Machinery Industry Press on Mar. 1, 2003.

At present, the perfect secrecy system is achieved mainly based on the key, namely, how each bit of the plaintext is encrypted by an infinite number of true random keys to achieve the design purpose of the perfect secrecy system. However, the encryption algorithm used is mostly a single XOR, or other, the security of the whole system is totally dependent on the secure storage and transmission of the keys. Once the keys are disclosed, the security of the whole system is very fragile.

SUMMARY OF THIS INVENTION

The purpose of this invention is to provide a data encryption and decryption method and apparatus, and to address the problem that the security of the existing perfect secrecy key technology is entirely dependent on the secure storage and transmission of keys, and the ciphertext may be cracked once the keys are disclosed.

This invention provides a data encryption method, and the method comprises:

packeting plaintext data to be encrypted;

assigning an encryption function randomly to each group of the plaintext data;

encrypting each group of the plaintext data with the encryption function respectively; and arranging the encrypted data according to its corresponding position in the plaintext data to form a ciphertext.

This invention provides a data encryption apparatus, and the apparatus comprises:

a packet module for packeting plaintext data to be encrypted;

an encryption function random assignment module for assigning an encryption function randomly to each group of the plaintext data packeted by the packet module; and an encryption processing module for encrypting the data in the plaintext by use of the encryption function assigned randomly by the encryption function random assignment module, and arranging the encrypted data according to its corresponding position in the plaintext data to form a ciphertext.

This invention provides a data decryption method, and the method comprises:

obtaining decryption message, and acquiring data from stored random seed to generate an encryption function index random string according to the decryption message;

according to the decryption message, determining the data traversal starting position of the encryption function index random string, and synchronously traversing the encryption function index random string and the ciphertext to be decrypted;

according to the decryption message, determining the encryption function corresponding to each bit data in the ciphertext;

according to the encryption function, determining the decryption function corresponding to each bit data in the ciphertext;

using the decryption function to restore each bit of data in the ciphertext to corresponding bit of data in the plaintext; and arranging various bits of data in the plaintext according to its corresponding position in the ciphertext data to form a plaintext.

This invention also provides a data decryption apparatus, and the apparatus comprises:

an acquisition module for obtaining the decryption message;

a random seed storage module for storing the random seeds generated at the time of encryption;

an encryption function index random string generation module for acquiring data from the random seeds stored by the random seed storage module to generate an encryption function index random string according to the decryption message obtained by the acquisition module;

a synchronous traversal module for determining the traversal starting position of the encryption function index random string according to the decryption message obtained by the acquisition message, and synchronously traversing the encryption function index random string and the ciphertext to be decrypted;

an encryption function determination module for determining the encryption function corresponding to each bit of data in the ciphertext according to the decryption message obtained by the acquisition module;

a decryption function acquisition module for determining decryption function corresponding to each bit of data in the ciphertext according to the encryption function determined by the encryption function determination module; and a plaintext recovery module for restoring various bits of data in the ciphertext by use of the decryption function as described into each bit of data in the plaintext, and arranging each bit of data in the plaintext according to its corresponding position in the ciphertext data to form a plaintext.

This invention functions to assign randomly a few stored encryption functions to the plaintext to be encrypted at the time of encryption, to encrypt the plaintext by use of the encryption function assigned, and then at the time of decryption, to obtain the decryption function of the ciphertext to be decrypted and the decryption keys for decryption by creating and based on the encryption function index random string, which greatly improves data security, and achieves the perfect secrecy of data.

DETAILED DESCRIPTION OF THE PRESENTLY PREFERRED EMBODIMENTS

The following preferred embodiments are provided for further illustrating, but not for limiting, the present invention.

The embodiments of this invention function to assign randomly the stored encryption functions to the plaintext to be encrypted at the time of encryption and to encrypt the plaintext with the encryption function assigned, to obtain the decryption function of the ciphertext to be decrypted at the time of decryption by generating the encryption function index random string and based on it, then to decrypt it.

Figure 1:
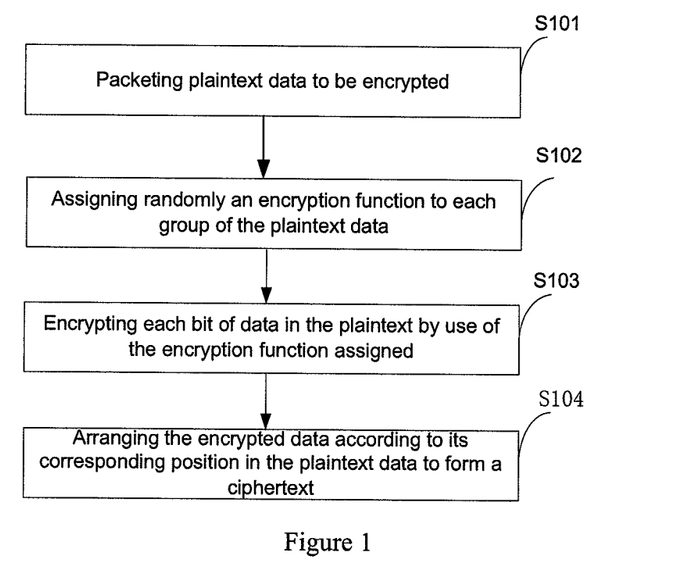
FIG. 1 shows a flow chart of the data encryption method in accordance with an embodiment of this invention.
Figure 9:
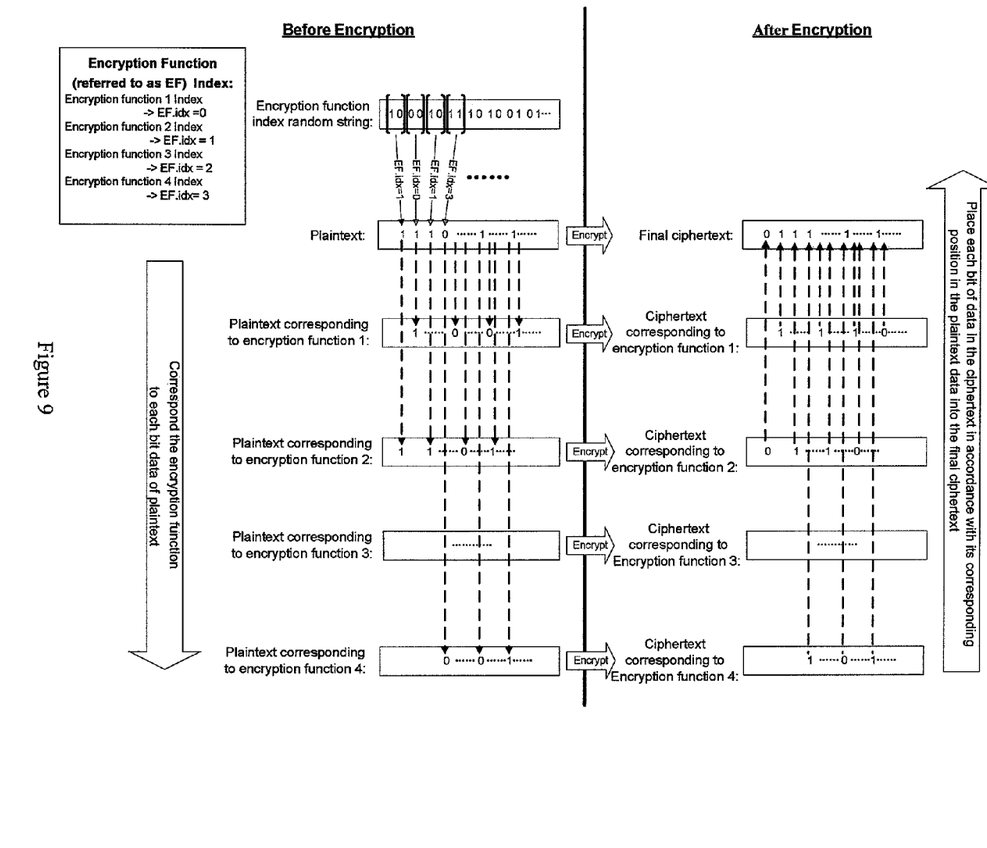
FIG. 9 shows a diagram of the data encryption process in accordance with an embodiment of this invention.

As shown in FIG. 1 and FIG. 9, the embodiment of this invention provides a data encryption method, including the following steps:

Step S101: packeting plaintext data to be encrypted;

Step S102: assigning randomly an encryption function to each group of the plaintext data;

The embodiment pre-selects a set of encryption functions for storage, and the stored encryption functions can cover all the conversion paths from any determined position 0, 1 in the plaintext to the corresponding position 0 or 1 in the ciphertext; after the selection is completed, the stored encryption function is randomly assigned to the plaintext to encrypt the plaintext during the encryption;

In this embodiment, each (bit) of data of the plaintext to be encrypted is regarded as a packet, that is, an encryption function is randomly assigned to each bit of data in the embodiment respectively, in practice, every 2 bits, every 3 bits, and every 4 bits of data of the plaintext to be encrypted can also be regarded as a packet;

Step S103: encrypting each bit of data in the plaintext by use of the encryption function assigned;

Step S104: arranging the encrypted data according to its corresponding position in the plaintext data to form a ciphertext.

Figure 2:
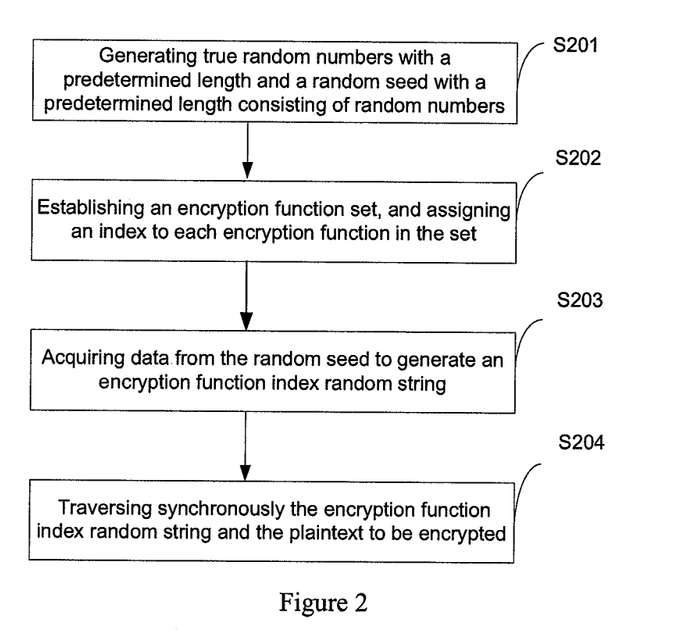
FIG. 2 shows a flow chart of the steps before assigning randomly encryption functions to the plaintext to be encrypted in accordance with an embodiment of this invention.

See FIG. 2, the embodiment of this invention between Step S101 and Step S102 also includes the following steps:

Step S201: generating true random numbers with a predetermined length and a random seed with a predetermined length consisting of random numbers;

The method for generating random numbers has been very mature, and in the specific implementation, the methods for generating random numbers given in Page 301 of *Applied Cryptography* issued by the Mechanical Industry Press on Mar. 1, 2003 can be used, for instance the random noise, computer clock, CPU load or the number of network packets and other methods are used to generate the required random number as a random seed, and the random seed generated is stored at the same time;

Step S202: establishing an encryption function set, and assigning an index to each encryption function in the set;

Each encryption function in the set has an index corresponding to it, and these different indexes are stored;

Step S203: acquiring data from the random seed to generate an encryption function index random string;

Step S204: traversing synchronously the encryption function index random string and the plaintext to be encrypted.

Figure 3:
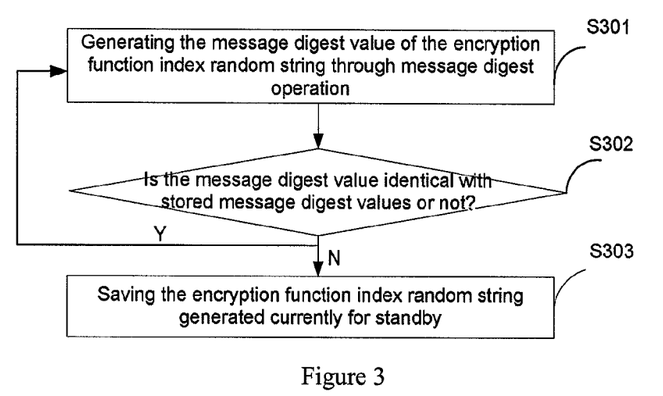
FIG. 3 shows a flow chart of the method used for repetition calibration of the encryption function index random string in accordance with an embodiment of this invention.

The embodiment of this invention functions to acquire data from the random seed to generate an encryption function index random string, and then also includes the steps for repetitive validation of the encryption function index random string; the specific implementation mode is shown in FIG. 3, and includes the following steps:

Step S301: generating the message digest value of the encryption function index random string through message digest operation;

Step S302: comparing whether the message digest value of the encryption function index random string is consistent with the previously stored message digest values or not; if the same, to acquire data in the random seed again, to regenerate an encryption function index random string, and perform Step S301; if not, perform Step S303;

Step S303: saving the encryption function index random string generated currently for standby.

When a new encryption function index random string is generated, through the use of message digest operations, such as MD5 and SHA1, this invention generates the message digest value of the encryption function index random string, compares the message digest value with the message digest values of the previously stored encryption function index random strings, and then determines whether the new generated encryption function index random string has been already used or not; if so, the encryption function index random string is regenerated, or else the generated encryption function index random string is saved for standby. After saving the encryption function index random string to be used, to save the message digest value of all the encryption function index random strings.

In this invention, generating and storing information, used and generated in the data encryption process, such as, the plaintext packet message, encryption function set and the index of each encryption function assigned, the key corresponding to each encryption function, the random seed used when data are acquired, and information used to regenerate the encryption function index random string corresponding to the encrypted plaintext and the traversal starting cursor position message of the encryption function index random string, to form the decryption message.

Figure 4:
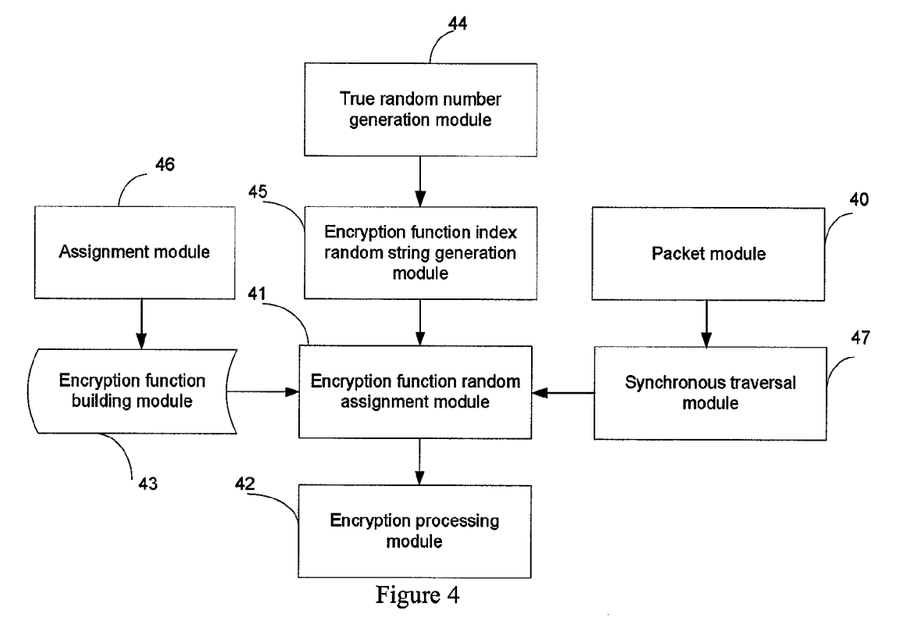
FIG. 4 shows a structure diagram of the data encryption apparatus in accordance with an embodiment of this invention.

As shown in FIG. 4, the embodiment of this invention provides a data encryption apparatus, and in order to facilitate description, only the part related to this invention is shown and the apparatus includes:

Packet module 40, encryption function random assignment module 41 and encryption processing module 42;

When data are encrypted, the packet module 40 packets each bit of data in the plaintext to be encrypted into a packet, and the encryption function random assignment module 41 randomly assigns an encryption function to each bit of data in the plaintext to be encrypted for encryption; the encryption processing module 42 encrypts each bit of data in the plaintext to be encrypted by use of the encryption function assigned by the encryption function random assignment module 41, and arranges each bit of data encrypted according to its corresponding position in the plaintext data to form a ciphertext and output.

Furthermore, the data encryption apparatus also includes:

Encryption function building module 43, true random number generation module 44, encryption function index random string generation module 45, assignment module 46 and synchronous traversal module 47;

The true random number generation module 44 is used for generating true random numbers with a predetermined length and a random seed with a predetermined length consisting of the random numbers, and the encryption function index random string generation module 45 acquires the data from the random seed to generate an encryption function index random string; the encryption function building module 43 is used to build and store an encryption function set; the assignment module 46 is used for assigning an index to each encryption function in encryption function set built by the encryption function building module 43; the synchronous traversal module 47 traverses synchronously the encryption function index random string generated by the encryption function index random string generation module 45 and the plaintext to be encrypted.

Where, the encryption function index random string generation module 45 includes:

A data acquisition unit for acquiring data from the random seed generated by the true random number generation module 44, and outputting the results of data acquisition;

An index random string generation unit for generating and saving the encryption function index random string according to the results of data acquisition returned by data acquisition unit.

Furthermore, the encryption function index random string generation module 45 also includes:

A message digest value generation module for generating the message digest value of the encryption function index random string generated by the index random string generation unit through the message digest operation;

A storage module for storing the message digest value of the encryption function index random string generated by the message digest value generation module;

A comparison module for comparing the message digest value generated by the message digest value generation module with the message digest values previously stored by the storage module, and returning the comparison results to the encryption function index random string generation module 45.

If the comparison result returned by the comparison module is "same", then the encryption function index random string generation module 45 regenerates an encryption function index random string, and the message digest values of that is compared repeatedly through the comparison module, until a different encryption function index random string is generated.

As the perfect secrecy system needs to meet that the posterior probability of ciphertext intercepted is equal to its prior probability, any determined plaintext can be converted to any ciphertext by at least one way, and these ways of conversion are totally of equal probability (See the document Shannon, Claude (1949). Communication Theory of Secrecy Systems, Bell System Technical Journal 28 (4): 656-715 for the details). For the binary plaintext and ciphertext stored in the computer, as all plaintexts and ciphertexts are composed of a string of 0 or 1 which length is determined, any determined bit 0 or 1 of the plaintext is enabled to be converted into 0 or 1 in the corresponding position of the ciphertext by at least one way all the time, and the way of conversion called by this invention is conversion path.

To achieve the perfect secrecy needs of this invention, a minimum set of encryption functions needs to be found so that it can cover all conversion paths from any determined position 0, 1 in the plaintext to the corresponding position 0 or 1 in the ciphertext.

Figure 5:
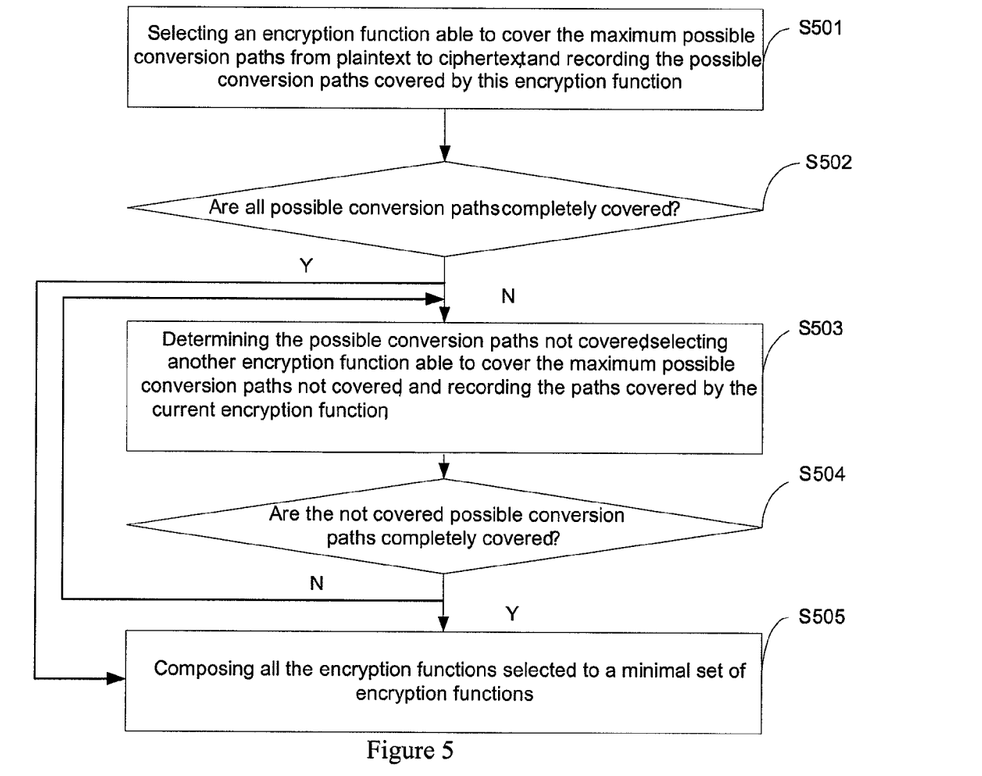
FIG. 5 shows a flow chart of the method used for building a minimum set of encryption functions in accordance with an embodiment of this invention.

As shown in FIG. 5, this invention uses the following method to select the minimum set of encryption functions, and its implementation steps are below:

Step S501: selecting an encryption function able to cover the maximum possible conversion paths from plaintext to ciphertext, and recording the possible conversion paths covered by this encryption function;

Step S502: determining whether all the possible conversion paths are completely covered, and if so, to perform Step S505; otherwise, to perform Step S503;

Step S503: determining the possible conversion paths not covered, selecting another encryption function able to cover the maximum possible conversion paths not covered, and recording the paths covered by the current encryption function and to perform Step S504;

Step S504: determining whether the possible conversion paths not covered are completely covered, and if so, to perform Step S505; otherwise, to perform Step S503;

Step S505: composing all the encryption functions selected to a minimal set of encryption functions.

In order to verify the feasibility of the method, the following two cases are cited, but the scope of protection of this invention is not limited to the two implementations. Identifying the conversion of the data M (x) in any predetermined position x of the plaintext to the data E (x') in the corresponding position x' of the ciphertext as M (x)->E (x'), where M (x), E (x')=0 or 1.

Method A:

By selecting the following encryption functions and keys,

Encryption function 1: XOR. The corresponding operational rule is as follows:

$0 \oplus 0 = 0$ $0 \oplus 1 = 1$ $1 \oplus 0 = 1$ $1 \oplus 1 = 0$

Encryption function 2: f(a)=a, where a is the input or output. The corresponding operational rule is:

$f(0) = 0$ $f(1) = 1$

The following conversion paths are covered

| M(x) -> E(x') | Encryption function(Encryption function and key) |
|---|---|
| M(x) = 0, E(x') = 0 | Encryption function 2, i.e. E(x') = f(M(x)) |
| M(x) = 0, E(x') = 1 | Encryption function 1, the key is 1, i.e. E(x') = M(x) $\oplus$ 1 |
| M(x) = 1, E(x') = 0 | Encryption function 1, the key is 1, i.e. E(x') = M(x) $\oplus$ 1 |
| M(x) = 1, E(x') = 1 | Encryption function 2, i.e. E(x') = f(M(x)) |

Method B:

By selecting the following encryption function and keys,
Encryption function 1: logical negation operation (~). The corresponding operational rule is:

$$\sim 0 = 1$$

$$\sim 1 = 0$$

Encryption function 2: f(a)=a, where a is the input or output. The corresponding operational rule is:

$$f(0)=0$$

$$f(1)=1$$

The following conversion paths are covered.

| M(x) -> E(x') | Encryption function(Encryption function and key |
|---|---|
| M(x) = 0, E(x') = 0 | Encryption function 2, i.e. E(x') = f(M(x)) |
| M(x) = 0, E(x') = 1 | Encryption function 1, i.e. E(x') = ~M(x) |
| M(x) = 1, E(x') = 0 | Encryption function 1, i.e. E(x') = ~M(x) |
| M(x) = 1, E(x') = 1 | Encryption function 2, i.e. E(x') = f(M(x)) |

To sum up, users can select a minimum set of encryption functions by a certain method, and then through the encryption function random assignment method provided in this invention, make the conversion paths from the plaintext to ciphertext completely random and with equal possibility.

In use, after users select the minimum set of encryption functions and keys, they can add other encryption functions and keys necessary, to make the system more secure, and ultimately the determined encryption function set will be called by the encryption method provided in this invention.

Figure 6:
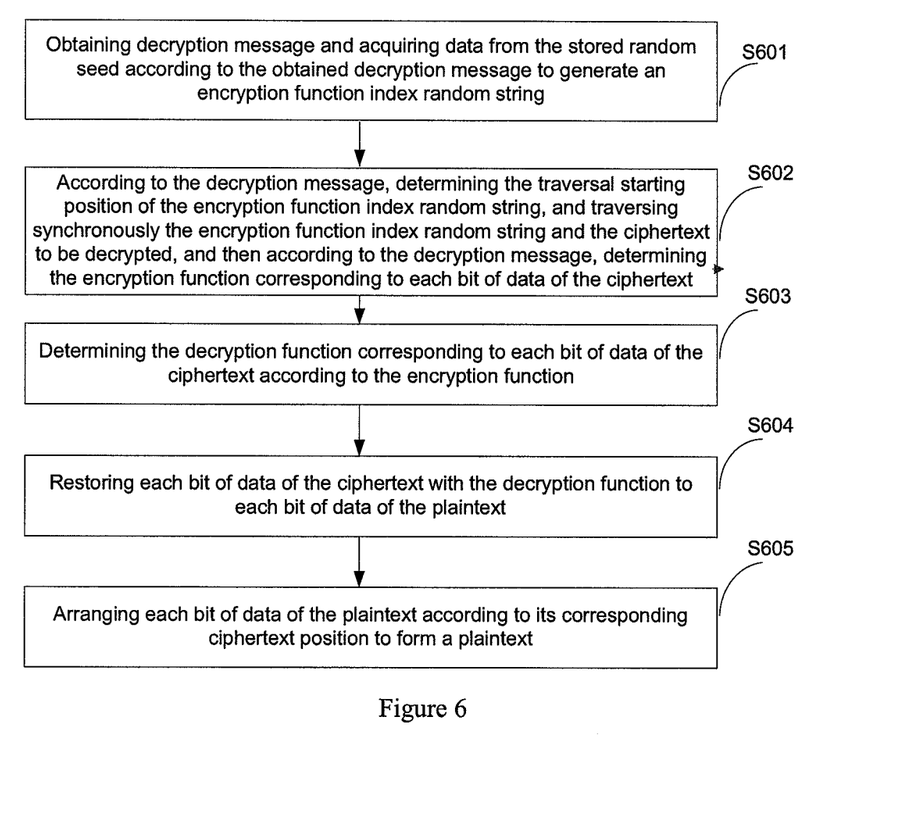
FIG. 6 shows a flow chart of the data decryption method in accordance with the embodiment of this invention.
Figure 10:
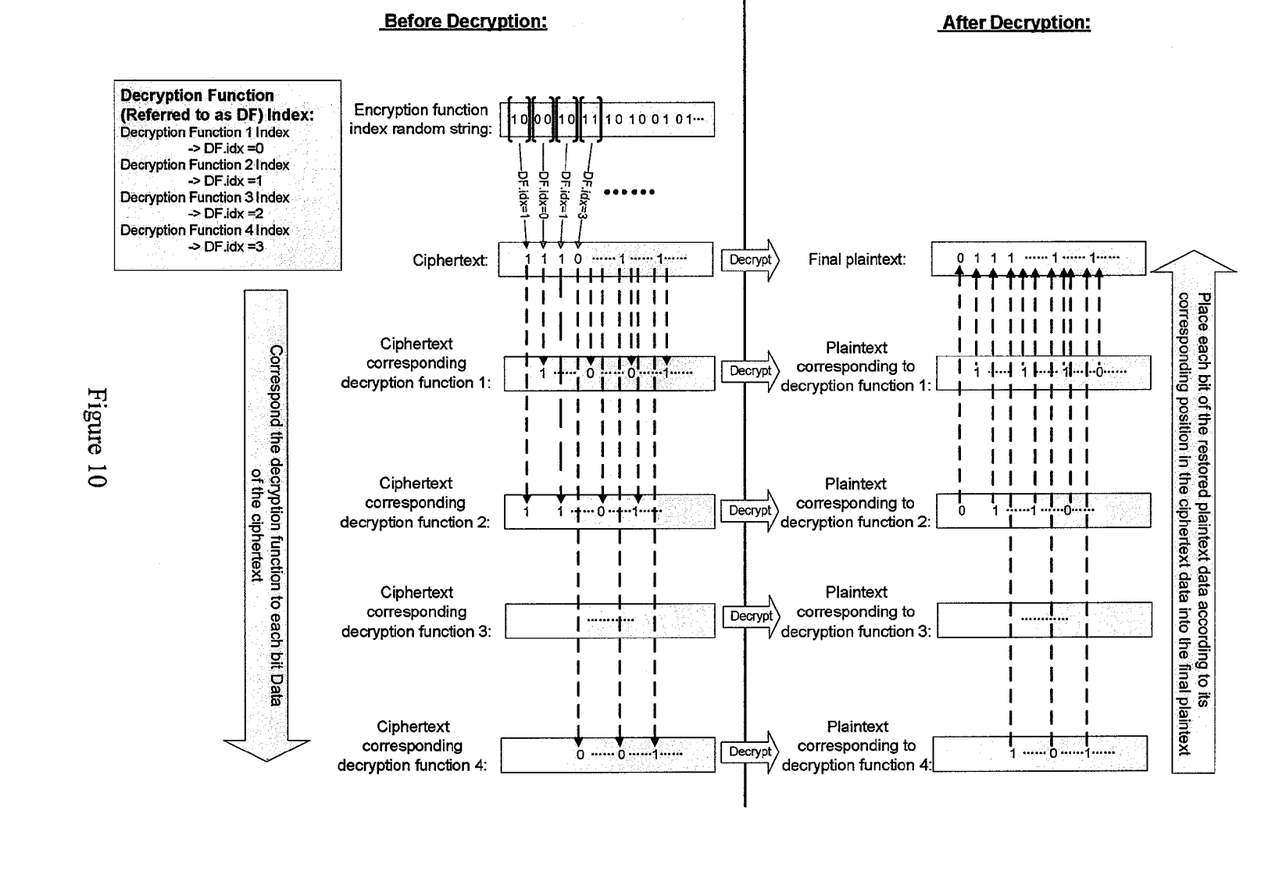
FIG. 10 shows a diagram of the data decryption process in accordance with an embodiment of this invention.

In response to the above encryption method, this invention also provides a data decryption method, as shown in FIG. 6 and FIG. 10. The method comprises the following steps:

Step S601: obtaining decryption message and acquiring data from the stored random seed according to the obtained decryption message to generate an encryption function index random string;

The obtained decryption message is formed in the process of data encryption, including the plaintext data packet message, the stored random seed at the time of data encryption, the information required for regeneration of the encryption function index random string corresponding to the encrypted plaintext from random seed, and the traversal starting cursor position message of the encryption function index random string;

Step S602: according to the decryption message, determining the traversal starting position of the encryption function index random string, and traversing synchronously the encryption function index random string and the ciphertext to be decrypted, and then according to the decryption message, determining the encryption function corresponding to each bit of data of the ciphertext;

Step S603: determining the decryption function corresponding to each bit of data of the ciphertext according to the encryption function;

Step S604: restoring each bit of data of the ciphertext with the decryption function to each bit of data of the plaintext;

Step S605: arranging each bit of data of the plaintext according to its corresponding ciphertext position to form a plaintext.

In this invention, each decryption function includes its corresponding decryption key; each decryption function is one-to-one corresponding to an encryption function, and the decryption key needed for decryption is also corresponding to the encryption key used by its encryption function.

Figure 7:
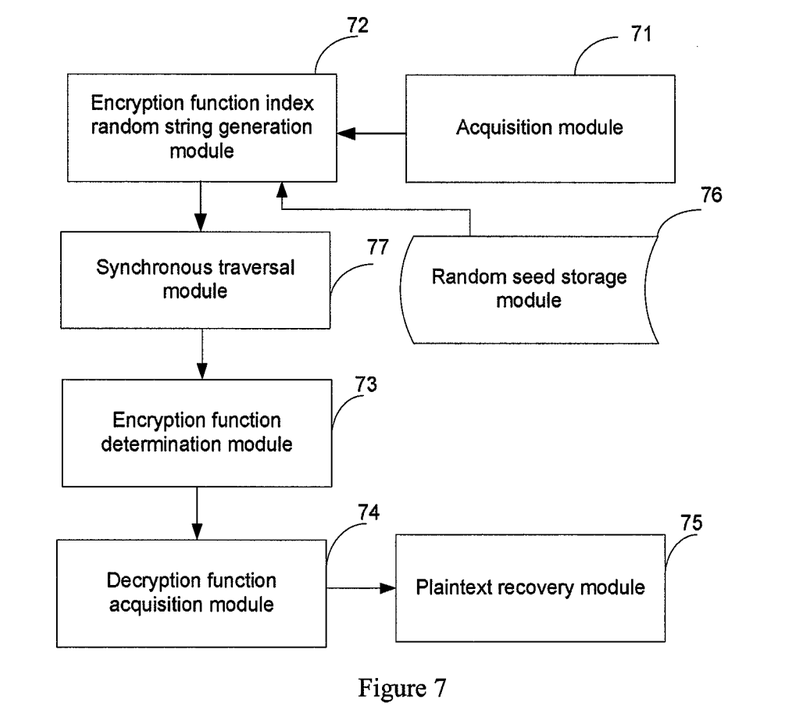
FIG. 7 shows a structure diagram of the data decryption apparatus in accordance with an embodiment of this invention.

As shown in FIG. 7, the embodiment of this invention also provides a data decryption apparatus; for the convenience of illustration, only the part related to this invention is shown. The apparatus includes:

Acquisition module 71, used for obtaining the decryption message;

Random seed storage module 76, used for storing the random seeds generated at the time of encryption;

Encryption function index random string generation module 72, used for acquiring data from the random seed stored in the random seed storage module 76 according to the decryption message acquired by the acquisition module 71 to generate an encryption function index random string;

Synchronous traversal module 77, used for determining the traversal starting position of encryption function index random string according to the decryption message obtained by the acquisition module 71, and for traversing synchronously the encryption function index random string and the ciphertext to be decrypted;

Encryption function determination module 73, used for determining the encryption function corresponding to each bit of data in the ciphertext according to the decryption message obtained by the acquisition module 71;

Decryption function acquisition module 74, used for determining the decryption function corresponding to each bit of data in the ciphertext according to the encryption function determined by the encryption function determination module 73;

Plaintext recovery module 75, used for restoring each bit of data in the ciphertext by use of the decryption function to each bit of data in the plaintext, and for arranging various bits of data of the plaintext according to its corresponding position in the ciphertext data to form a plaintext.

To further demonstrate the feasibility of this invention, an example in the following is given to comprehensively explain the above approach to achieve encryption.

Method 1, Encryption Function Index Random String Fixed Bit Method

Assuming there are a number of plaintext to be encrypted, of which the plaintext k has m bits, and has n kinds of encryption algorithms to be selected, where m, n, k are natural numbers, and randomly, an encryption function and the corresponding key are assigned to each bit of data of the plaintext k;

Firstly, a string of w-bit true random number 0, 1 with a predetermined length is generated as a random seed, of which w is a natural number, and w>m;

Data from the random seed is acquired randomly for the predetermined times u (u is a natural number), and the starting cursor position of data acquisition every time and the length of the data acquired (which can be greater than or equal to 0) are random. If the data is acquired to the tail of the random seed, return to the head to continue data acquisition;

The data acquired every time are cascaded into an encryption function index random string with the predetermined length of p bits, and p is a natural number. If $\log_2 n$ is an integer, $p > m \times \log_2 n$; if $\log_2 n$ is a non-integer, $p > m \times [\log_2 n+1]$, of which $[\log_2 n+1]$ is the rounding operation for $\log_2 n+1$.

Whether the generated encryption function index random string was ever used or not is determined. If so, regenerate an encryption function index random string, or else retain the encryption function index random string for standby;

A decimal digit identifier is assigned to each encryption function in the encryption function set, for instance, 0 is assigned to the first encryption function, 1 is assigned to the second encryption function, 2 is assigned to the third encryption function, and 3 is assigned to the fourth encryption function;

Then, begin to traverse the data synchronously from the head of the generated encryption function index random string and the plaintext to be stored, and at first take $\log_2 n$ or $[\log_2 n]+1$ bits for each time traversing, where $[\log_2 n]$ is the rounding operation of $\log_2 n$, the $\log_2 n$ or $[\log_2 n]+1$ bits binary number traversed every time is converted to decimal number, and the converted value is operated modulo for n and the modulo value is the encryption function index corresponding to the bit of plaintext data;

Continue to traverse the encryption function index random string and the plaintext synchronously until an encryption function is randomly assigned to all or part of the plaintext bits;

Before each data acquisition, need to first generate two random values, conduct modulo operations on them respectively, and then obtain the random starting cursor position and the required length of the data acquired;

Assuming two random numbers R1, R2 are generated before data acquisition, need to generate two random values T1, T2 that are less than w and p−q respectively (where, q is a natural number less than or equal to p, w is the length of the random seed, p is the length of the random string required to generate the encrypted bit of the plaintext, q is the length of the generated data, and p−q is the bit number of the random string's remaining data not acquired), then $$T1 = R1 \bmod w$$

$$T2 = R2 \bmod (p-q)$$

Where, mod is modulo operation.

Figure 8:
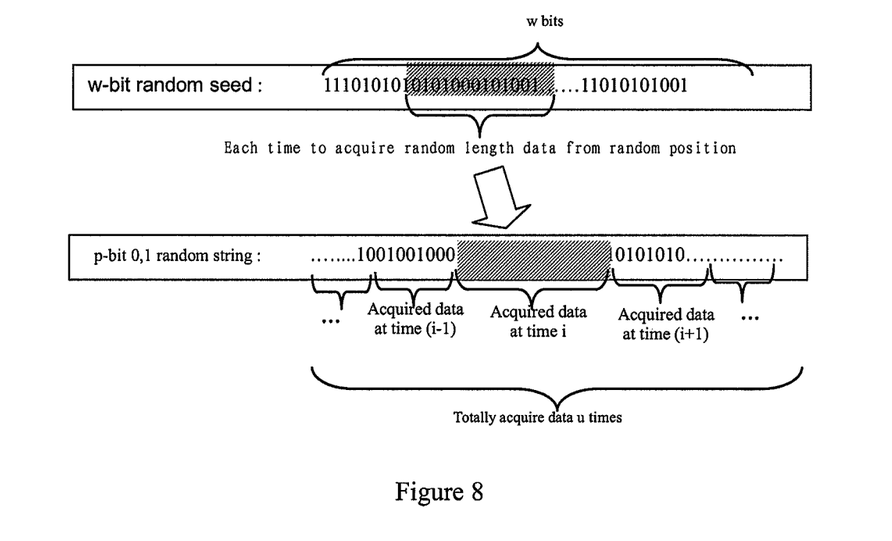
FIG. 8 shows a schematic diagram of the encryption function index random string generation in accordance with an embodiment of this invention.

The generation method for the encryption function index random string is shown in FIG. 8.

If identifying the p-bit encryption function index random string corresponding to the plaintext k as $re_k$, then $re_k$ is equal to the order combination of the data acquired randomly for u times from the random seed with a predetermined length. If the data acquired at the time i from the random seed is $(Cur_s, Cur_e)_i$, where i is a natural number, and i≤u, $Cur_s$ is the starting cursor position of the data acquired at the time i in the random seed; correspondingly, $Cur_e$ is the ending cursor position of the data acquired at the time i, and both $Cur_s$ and $Cur_e$ are an offset identifier from the random seed head, so it is clear $0 \leq Cur_s \leq Cur_e \leq m$; when $Cur_e$ is equal to $Cur_s$, the bit number of the data acquired is 0, and then the data acquired at the time i is data bits between $Cur_s$ and $Cur_e$ in the random seed with the predetermined length; further, the p-bit encryption function index random string $re_k$ corresponding to the plaintext k can be expressed as:

$$re_k = [(Cur_s, Cur_e)_1, (Cur_s, Cur_e)_2, \ldots (Cur_s, Cur_e)_i, (Cur_s, Cur_e)_u]_k;$$

To illustrate the feasibility of this invention, the true randomness/non-reproducibility of the encryption function index random string generated by the method 1 is analyzed. To ensure the encryption function index random string, after comparison by the comparison module, not repeatedly used and truly random, is very important for the entire system not to be cracked by the cryptanalysts.

What needs to be reiterated is that as long as the characters used to compose a random string is limited, the random string may be reproduced, and its randomness is reflected in the very small probability and irregularity of reproduction. Assuming the random string has 1024 bits, because a random string can be composed of only 0 and 1 character, whatever it is random, the probability of its reproduction is still greater than or equal to $1/2^{1024}$, or $1/(1.79 \times 10^{308.})$ In the method 1, the true randomness of encryption function assigned to each plaintext is reflected in two places: one is the random seed composed of random numbers, and the other is to randomly acquire data from the random seed (the starting position of data acquisition and the length of acquisition are derived from the true random number), to generate a p-bit encryption function index random string.

Then, traverse p-bit random string from a fixed position (it is the head of a random string in the method), to generate an encryption function index corresponding to the part of each plaintext (through modulo operation).

Further, it can be calculated for method 1 that the probability to allocate the same encryption function index to the same bit of the plaintext depends on the reproduction probability of the p-bit encryption function index random string, where only the probability of the p-bit random string reproduced based on the same random seed is considered.

Method 2, Encryption Function Index Random String Non-Fixed Bit Method

The method 2 is similar to the method 1, but the difference is that in this method, the index value of encryption function is generated by traversing from the random starting position of p-bit encryption function random string, and the security of the whole method is enhanced through the uncertainty of the starting traversal position. The details are as follows (setting the variables as same as the method 1):

First, generate a true random 0, 1 string with a predetermined length of w bits as the random seed, of which w is a natural number, and w>m;

Random data from the random seed are acquired for the predetermined times u (u is a natural number), and the starting position of data acquisition every time and the length of the data acquired (which can be greater than or equal to 0) are random. If the data are acquired to the tail of the random seed, return to the head to continue data acquisition;

The data acquired every time are cascaded into an encryption function index random string with the predetermined length of p bits, and p is a natural number. If $\log_2 n$ is an integer, $p > m \times \log_2 n$; if $\log_2 n$ is a non-integer, $p > m \times [\log_2 n+1]$, of which $[\log_2 n+1]$ is the rounding operation for $\log_2 n+1$.

Whether the generated encryption function index random string was ever used or not is determined. If so, regenerate an encryption function index random string, or else retain the encryption function index random string for standby;

A decimal digit identifier is assigned to each encryption function in the encryption function set, for instance, 0 is assigned to the first encryption function, 1 is assigned to the second encryption function, 2 is assigned to the third encryption function, and 3 is assigned to the fourth encryption function;

Then, predetermine a random starting position in the p-bit random string, begin to traverse the data synchronously from the this position of the random ring and the head of the plaintext, and at first take $\log_2 n$ (if $\log_2 n$ is an integer) or $[\log_2 n]+1$ (if $\log_2 n$ is a non-integer) bits for each time traversing, where $[\log_2 n]$ is the rounding operation of $\log_2 n$, the $\log_2 n$ or $[\log_2 n]+1$ bit binary number traversed every time is converted to decimal number, and the converted value is operated modulo for n and the modulo value is the encryption function index corresponding to the bit of plaintext data;

Continue to traverse the encryption function index random string and the plaintext synchronously, and when data are traversed to the tail of the encryption function index random string, return the head to continue traversing, until an encryption function is randomly assigned to all of the plaintext bits;

Before each data acquisition, first generate two random values, operate them modulo, respectively, and obtain a random starting cursor position and the required length of the data acquired; the method for obtaining the random starting cursor position and the required length of the data acquired is the same as the method 1.

Assuming a true random number R3 is generated before data traversal, now need to generate a random value T3 less than p, and T3 is the starting position where p-bit random string is traversed, then $$T3 = R3 \bmod p$$

Where, mod is modulo operation.

To further illustrate the feasibility of the embodiment of this invention, the true randomness/non-reproducibility of the encryption function index random string in the method 2 is analyzed.

Compared with the method 1, in the method 2, a factor affecting the randomness of the whole method is added, that is, in the p-bit random string, start from a random position traversing the data to generate the index of the encryption algorithm corresponding to each bit of the plaintext, because there are p kinds of possible traversal starting positions, the smallest probability of encryption function index random string reproduced corresponding to the plaintext is $1/(p*w^u)$.

Further, taking the data set in the method 1 as example, where $p > m \times \log_2 n$, that is $p > 160,000,000$, or 160M bits. Therefore, the smallest probability of repeating $re_k$ by the method is $1/(1.6*10^{9008})$ and it shows the probability of its repetition is low enough, in line with the characteristics of a random feature. In actual use, its randomness can also continue to be increased and the probability of its repetition is reduced by increasing p, u and w values, or the random seed is regularly replaced to improve the security of the whole method.

In summary, the method of random assignment of encryption functions to the plaintext that can be proved feasible in practice by the above embodiments.

This invention, compared with OTP method, a typical implementation of traditional perfect secrecy system, has the following advantages:

1. Because of the protective effect of encryption function itself (in case that its cryptographic key is unknown to cryptanalysts, a lot of computing power is needed to restore the ciphertext into the unique plaintext), the risk of data leakage resulting from the accidental leakage of a one-time pad (in terms of this invention, it corresponds to encryption function index random string) can be effectively reduced;

2. The security protection of the entire system is fragmented into three parts—random seed, encryption function index random string and the key corresponding to each encryption function, that is, the ciphertext can be easily cracked only after the three parts of message are intercepted at the same time, and compared with the security of the traditional OTP system depends only on one part, the protection of one-time pad (a large number of random keys), the risk of data leakage is effectively dispersed.

In the embodiment of this invention, encryption functions are properly selected, each bit of data in the plaintext is encrypted using the randomly assigned encryption function, then the posterior probability after the ciphertext is intercepted is equal to the prior probability to crack ciphertext, and it has the same encryption strength as the traditional OTP method; meanwhile, compared with the security of the traditional OTP system depending only on one part, the protection of one-time pad, the risk of data leakage is effectively dispersed, and thus the risk of data leakage resulting from the accidental disclosure of the one-time pad can be effectively reduced.

All above is just the preferred embodiment of this invention, but is not used to limit this invention; any changes, equivalent replacements and improvements and other aspects made within the spirit and principle of this invention should be included in the protective range of this invention.

The invention claimed is:

1. A data encryption method carried out in at least one computer, comprising: comprising:
    packeting plaintext data to be encrypted;
    generating true random numbers with a predetermined length and a random seed with a predetermined length formed by the true random numbers;
    establishing an encryption algorithm set and assigning an index to each encryption algorithm in the encryption algorithm set;
    acquiring data from the random seed to generate an encryption algorithm index random string;
    traversing synchronously the encryption algorithm index random string and the plaintext to be encrypted;
    selecting an encryption algorithm from the encryption algorithm set according to the encryption algorithm index when traversing the encryption algorithm index random string and assigning the encryption algorithm to each group of the plaintext data at the corresponding position;
    encrypting each group of the plaintext data with the assigned encryption algorithm respectively; and
    arranging the encrypted data according to its corresponding position in the plaintext data to form a ciphertext;
    wherein the step of acquiring comprises:
    generating and storing an initial message digest value of the encryption algorithm index random string through message digest operation;
    generating a subsequent message digest value of the encryption function algorithm index random string through message digest operation; and
    comparing the subsequent message digest value with the previously stored initial message digest values, and if the same, acquiring the data from the random seed again to generate a new encryption function algorithm index random string, and then comparing the message digest values until a different encryption function algorithm index random string is determined; if not the same, saving the encryption function algorithm index random string currently generated.

2. The method of claim 1 wherein the encryption algorithm set comprises the encryption algorithm of all conversion routes converting from any bit data 0 or 1 in the plaintext to a bit data 0 or 1 at the corresponding position in the ciphertext, and correspondingly, the step of establishing comprises:

selecting the encryption algorithm to cover maximum possible conversion routes from the plaintext to ciphertext;
recording the possible conversion routes;
determining whether all possible conversion routes are completely covered; if so, using all the selected encryption algorithms to create the encryption algorithm set; otherwise, selecting another encryption algorithm covering the maximum possible conversion routes of the remaining;
recording the routes covered by the current encryption algorithm;
re-selecting an encryption algorithm covering the maximum possible conversion routes not covered, until the selected encryption algorithm can cover all the possible conversion routes; and
using the encryption algorithm selected to create the encryption algorithm set.

3. The method of claim 1 wherein each group of the plaintext data comprises at least one bit data.

4. A data encryption apparatus comprising:
a packet module for packeting plaintext data to be encrypted;
a true random number generation module for generating true random numbers with a predetermined length and a random seed with a predetermined length consisting of the true random number;
an encryption algorithm building module for building and storing encryption algorithm set;
an assignment module for assigning an index to each encryption algorithm in encryption algorithm set built by the encryption algorithm building module;
an encryption algorithm index random string generation module for acquiring data from the random seed generated by the true random number generation module, to generate an encryption algorithm index random string;
a synchronous traversal module for traversing synchronously the encryption algorithm index random string generated by encryption algorithm index random string generation module and the plaintext;
an algorithm selecting module for selecting an encryption algorithm from the encryption algorithm set according to the encryption algorithm index when traversing the encryption algorithm index random string;
an encryption algorithm assignment module for assigning the encryption algorithm to each group of the plaintext data packeted by the packet module at the corresponding position; and
an encryption processing module for encrypting the data in the plaintext by use of the encryption algorithm assigned by the encryption algorithm random assignment module, and arranging the encrypted data according to its corresponding position in the plaintext data to form a ciphertext;
wherein the encryption algorithm index random string generation module comprises:
a data acquisition unit for acquiring the data from the random seed generated by the true random number generation module, and returning the results of data acquisition;
an index random string generation unit for generating and saving an encryption algorithm index random string according to the results of data acquisition returned by the data acquisition unit;

a message digest value generation module for generating a message digest value of the encryption algorithm index random string generated by the index random string generation unit through message digest operation;
a storage module for storing message digest values of the encryption algorithm index random strings generated by the message digest value generation module; and
a comparison module for comparing the message digest value generated by the message digest value generation module with the message digest values previously stored by the storage module, and returning the comparison result to the encryption algorithm index random string generation module.

5. A data encryption method carried out in at least one computer, comprising: comprising:
packeting plaintext data to be encrypted;
generating true random numbers with a predetermined length and a random seed with a predetermined length formed by the true random numbers;
establishing an encryption algorithm set and assigning an index to each encryption algorithm in the encryption algorithm set;
acquiring data from the random seed to generate an encryption algorithm index random string;
traversing synchronously the encryption algorithm index random string and the plaintext to be encrypted;
selecting an encryption algorithm from the encryption algorithm set according to the encryption algorithm index when traversing the encryption algorithm index random string and assigning the encryption algorithm to each group of the plaintext data at the corresponding position;
encrypting each group of the plaintext data with the assigned encryption algorithm respectively; and
arranging the encrypted data according to its corresponding position in the plaintext data to form a ciphertext;
wherein the encryption algorithm set comprises the encryption algorithm of all conversion routes converting from any bit data 0 or 1 in the plaintext to a bit data 0 or 1 at the corresponding position in the ciphertext, and correspondingly, the step of establishing comprises:
selecting the encryption algorithm to cover maximum possible conversion routes from the plaintext to ciphertext;
recording the possible conversion routes;
determining whether all possible conversion routes are completely covered; if so, using all the selected encryption algorithms to create the encryption algorithm set; otherwise, selecting another encryption algorithm covering the maximum possible conversion routes of the remaining;
recording the routes covered by the current encryption algorithm ;
re-selecting an encryption algorithm covering the maximum possible conversion routes not covered, until the selected encryption algorithm can cover all the possible conversion routes; and
using the encryption algorithm selected to create the encryption algorithm set.

* * * * *